United States Patent [19]
Schockemoehl et al.

[11] Patent Number: 5,669,812
[45] Date of Patent: Sep. 23, 1997

[54] EXHAUST GAS DIFFUSER INTERFACE

[75] Inventors: Gene F. Schockemoehl, Claremore; L. Matt Farabee, Owosso; David W. Daniels, Sapulpa, all of Okla.

[73] Assignee: Braden Manufacturing, Tulsa, Okla.

[21] Appl. No.: 604,735

[22] Filed: Feb. 21, 1996

[51] Int. Cl.⁶ .................................................. F16L 13/04
[52] U.S. Cl. ........................... 454/45; 60/39.32; 285/187; 285/223; 285/286
[58] Field of Search ........................ 454/1, 44, 45; 60/39.32; 285/187, 223, 235, 286

[56] References Cited

U.S. PATENT DOCUMENTS

| | | | |
|---|---|---|---|
| 4,111,107 | 9/1978 | Engleke | 454/45 |
| 4,848,803 | 7/1989 | Bachmann | 285/47 |
| 5,358,284 | 10/1994 | Broyles | 285/47 |
| 5,378,026 | 1/1995 | Ninacs et al. | 285/286 X |
| 5,419,114 | 5/1995 | Bauermeister et al. | 60/39.32 |
| 5,570,573 | 11/1996 | Bonnelie | 60/39.32 X |

*Primary Examiner*—Harold Joyce
*Attorney, Agent, or Firm*—Harness, Dickey & Pierce, P.L.C.

[57] ABSTRACT

An exhaust gas diffuser interface includes a stainless steel shell with varying levels of insulation. The varying levels of insulation concentrate thermal expansion and contraction at the turbine outlet end allowing it to be connected to the outlet by way of a seal weld. This construction allows expansion and contraction of the diffuser interface in unison with the attached turbine outlet, as well as the diffuser inlet.

17 Claims, 4 Drawing Sheets

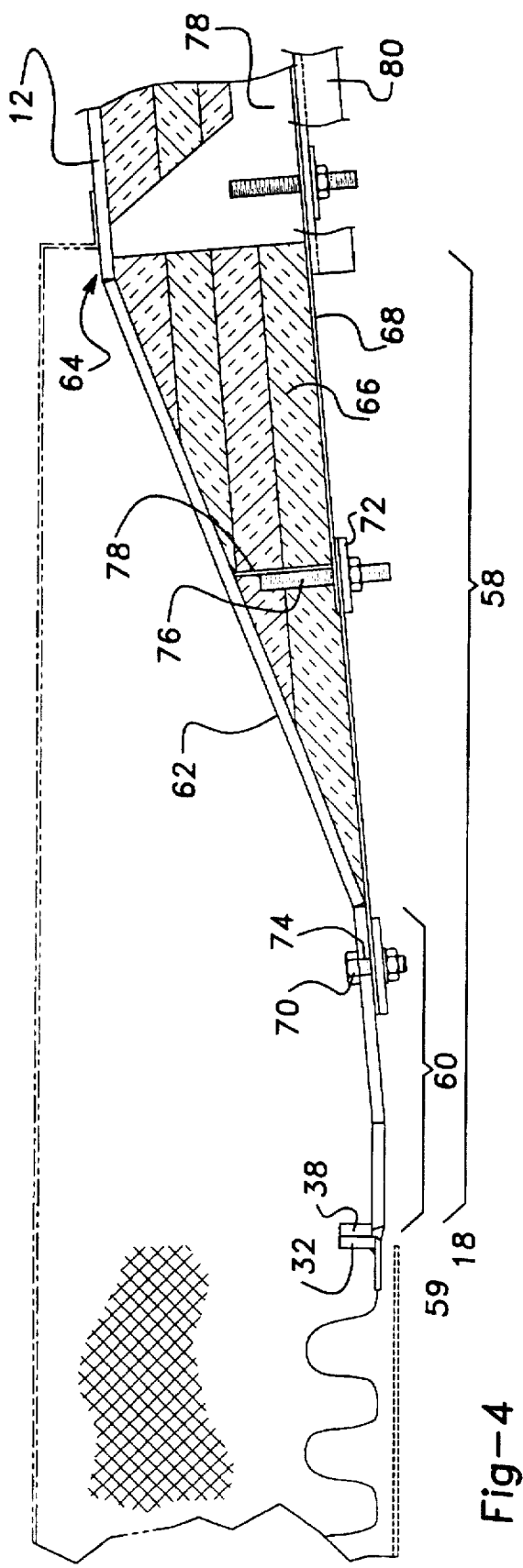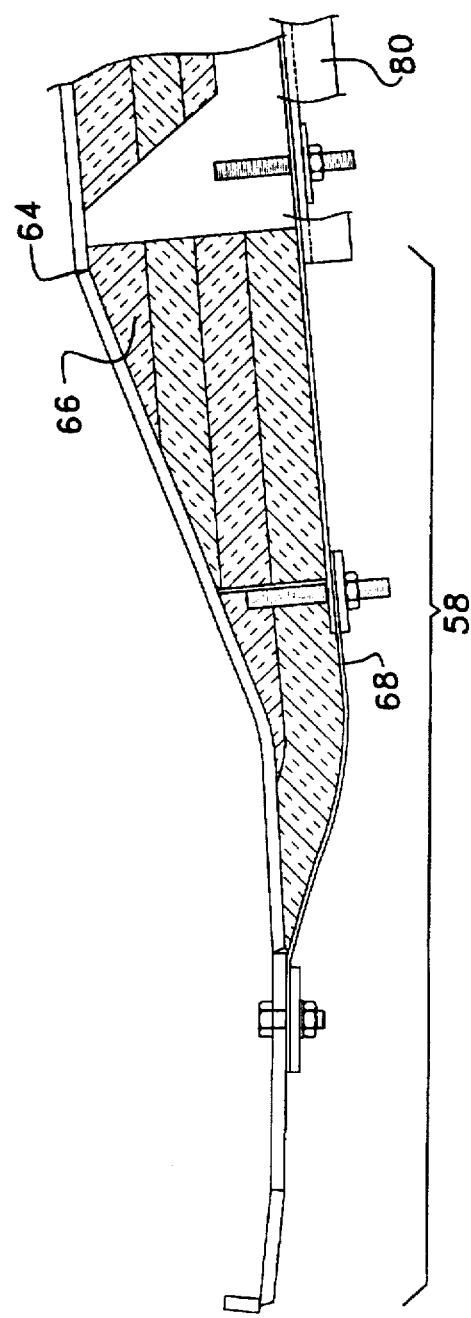

EXHAUST GAS DIFFUSER INTERFACE

BACKGROUND OF THE INVENTION

The invention pertains to an interface between the exhaust gas outlet of a gas turbine and the inlet of an internally insulated exhaust gas diffuser. The gas turbine referred to in this application is of the type generally used in power generation.

In constructing the power turbine system, the exhaust from the gas turbine would be routed through a diffuser on its way to being routed through other equipment by way of various valves in the exhaust stream. Exhaust diffusers are either internally insulated (i.e. the structural shell plate is protected from hot exhaust by internal insulation and liner system) or externally insulated (i.e. structural shell plate is exposed to hot exhaust.) The externally insulated equipment is considered to suffer from several deficiencies vis a vis internally insulated equipment. Namely, the internally insulated equipment is considered to be more efficient, to last longer in the field, and enjoy assembly benefits such as the ability to be shipped in at higher levels of assembly. The gas turbine is typically externally insulated while in many situations its remaining equipment is preferably internally insulated.

The exhaust outlet from the gas turbine has to be connected to the inlet of the diffuser in such a way to provide a seal so that no exhaust leaks to the outside or ambient air through the connection. This sealing relationship must be maintained throughout the operating conditions of the power generation system. By way of example, the interface between the exhaust gas outlet and the diffuser can go from temperatures of subzero degrees F. to over 1200° F. in the matter of a few minutes such as when a system located in a cold climate is started. Likewise, interruptions in operation of the gas turbine such as shut downs for maintenance, etc. will cause the interface to cool from elevated operating temperatures to the ambient temperature. These stresses of expanding and contracting must be repeatedly accommodated over the life of the interface.

Prior interfaces between the gas turbine and diffuser relied on complicated gasketing arrangements to provide a gas tight seal that would survive over repeated cycling. The provision of this gasketed seal required precise machining, numerous parts and involved field assembly. As a result, the seal area was difficult to assemble, and expensive, both from a parts manufacture and assembly standpoint. Small deviations in the machining could also result in a unsatisfactory seal.

Previously expanding bell type seals have been used experimentally in other connections in the exhaust path such as connecting exhaust plenums. Seals in these areas are not subject to the same stressful environment as immediately downstream of the turbine and before the diffuser. Results obtained from further downstream components are not always applicable to upstream situations.

SUMMARY OF THE INVENTION

The diffuser interface connection of the present invention reduces the possibility of exhaust gas leakage and is expected to provide a longer operating life than prior art diffuser interfaces. The diffuser interface is less expensive in that it does not need the costly machining of the prior art diffuser interfaces. The diffuser interface can also be either completely installed in the field or partially installed in the factory.

The diffuser interface includes a tapered cone shaped fabrication that is welded between the exhaust diffuser and the gas turbine exhaust flange. The interface is made from steel and has flanges welded on each end. It is installed by bolting and/or clamping it to the exhaust diffuser intake flange and the gas turbine exhaust flange. The joints are then seal welded to prevent any leakage of exhaust gas.

A varying level of insulation is installed in conjunction with the diffuser interface. By varying the level of internal insulation along the length of the diffuser interface, the location of where the diffuser interface undergoes its greatest expansion and contraction can be controlled. The insulation is installed so as to have that expansion and contraction take place in the region where the diffuser interface joins the exhaust gas outlet of the gas turbine. As a result, the welded joint between the diffuser interface and the gas turbine outlet can expand or contract as the gas turbine outlet expands or contracts, minimizing stresses between the interface and the exhaust gas outlet. The increased internal insulation downstream reduces the expansion and contraction rates for the outer surface of the diffuser interface so that when the interface is mated to the internally insulated diffuser inlet, that joint also expands and contracts with a minimum of thermal stress between the parts.

BRIEF DESCRIPTION OF THE DRAWINGS

FIG. 4 is the cross section view the interface according to the present invention.

FIG. 4A is a cross sectional view of the assembly of FIG. 4 during high temperature operation.

Normal gas flow direction in FIGS. 1–5 is left to right.

DETAILED DESCRIPTION OF THE INVENTION

Figure 1:
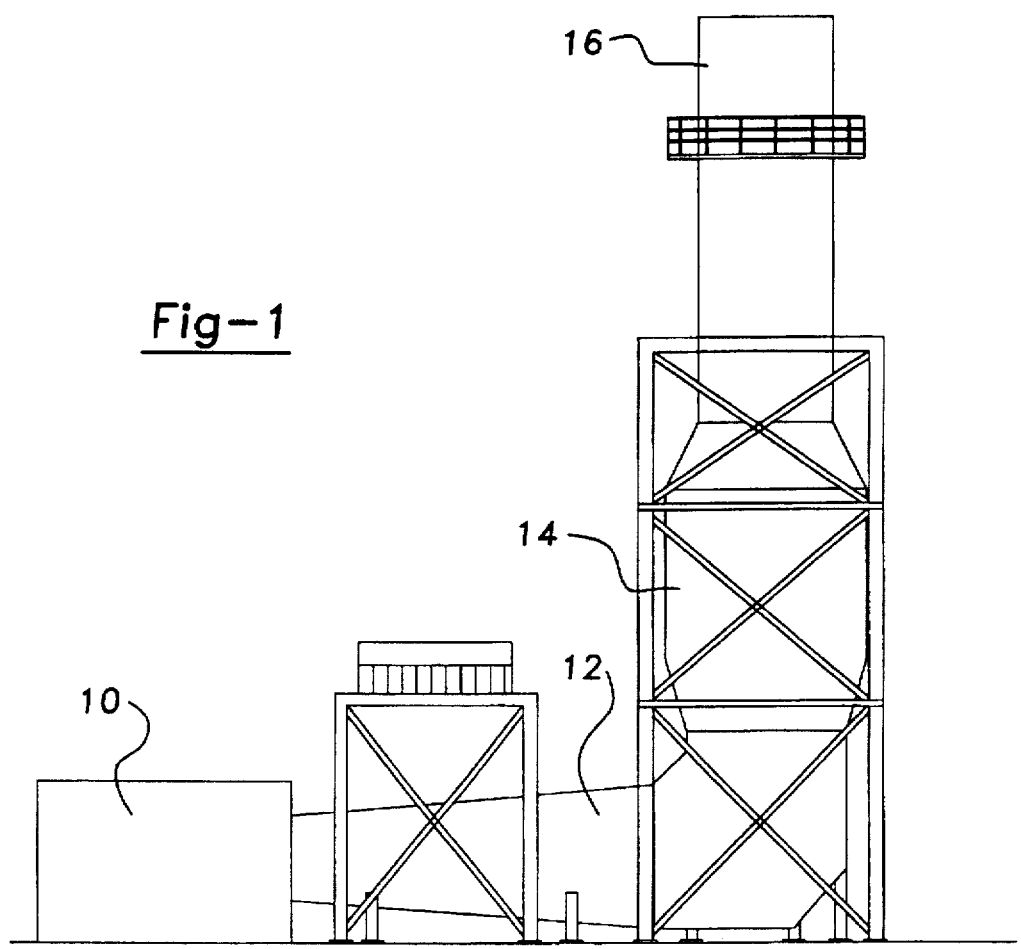
FIG. 1 is a representation of the major components of a power generation system showing an exemplary relative location.
Figure 2:
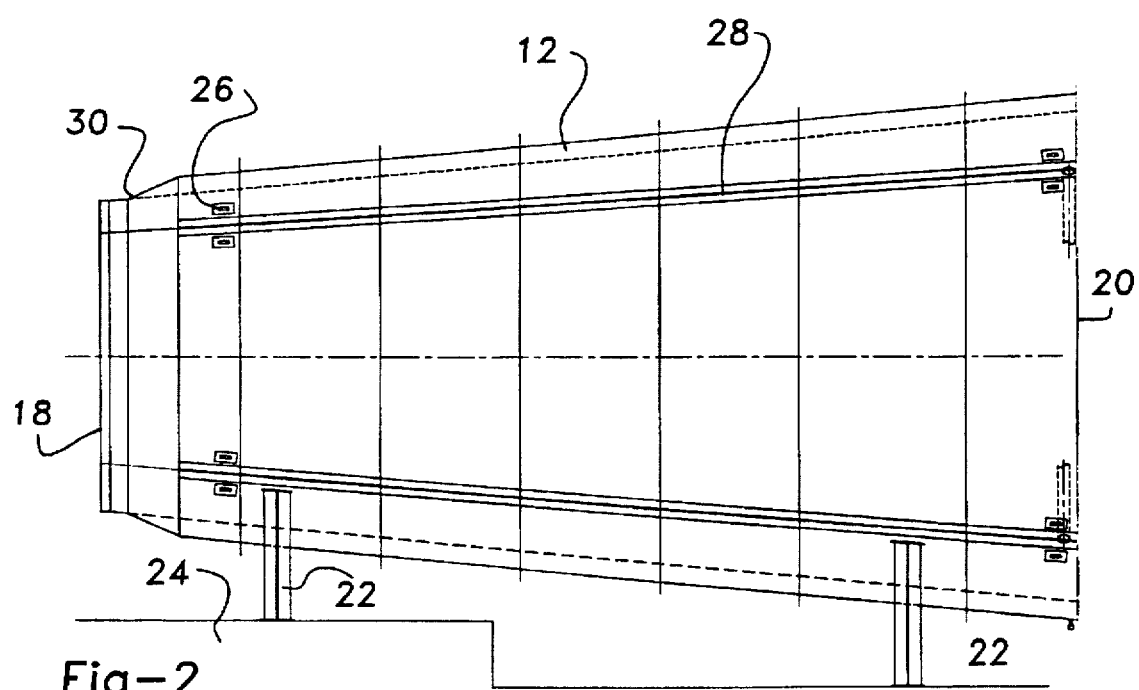
FIG. 2 is an elevational view of the exhaust gas diffuser and partially assembled interface of the present invention.

In a typical set up for a power generation system, a gas turbine is exhausted into a diffuser. Such a typical set up is shown in FIG. 1, wherein a gas turbine 10 is exhausted into a diffuser 12. The diffuser in turn can exhaust either directly or by intermediate channels into a silencer 14 to acoustically quiet the exhaust. The exhaust is eventually released to the top of the stack 16.

The diffuser itself is oftentimes of circular cross section. See FIG. 2. The diffuser 12 is also often conical, increasing in diameter from the turbine outlet end 18 towards the diffuser outlet end 20. The diffuser is supported on stands 22 which in turn are mounted to a concrete slab 24. The slab can be flat or stepped to correspond with the stands in achieving a horizontal orientation of the diffuser. Lifting lugs 26 are provided for positioning the diffuser into place during installation. The diffuser can be prefabricated in panels. The typical prefabrication may involve prefabricating the diffuser from four longitudinally extending panels, each panel representing approximately 90° of the diffuser circumference. The panels are then joined at panel seam lines 28.

Towards the turbine outlet end 18 of the diffuser 12 is mounted the diffuser interface 30, also sometimes referred to as the exhaust gas diffuser interface.

Figure 3:
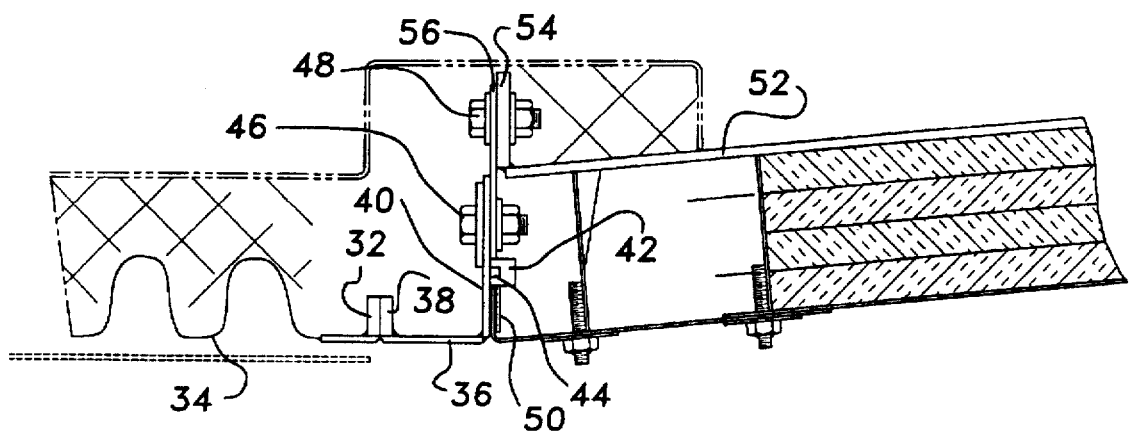
FIG. 3 is a cross sectional view of one wall of an interface joined to the outlet of the gas turbine as found in the prior art.

FIG. 3 shows a diffuser interface according to the prior art. The gas turbine 10 ends at a gas turbine flange 32 which itself is connected to the gas turbine by way of convoluted expansion joint 34. The prior art diffuser interface 36 has a first interface flange 38 connected to the gas turbine flange 32 consisting of a plate or ring. The face of the second interface flange 40 bears against a bar of stainless steel 42 in which a groove is machined to hold a fiberglass gasket 44. The stainless steel bar 42 and the fiberglass gasket 44 within it are clamped against the second interface flange 40 by a series of fasteners 46. The gasket performs the sealing function to make the joint gas tight. The retainer clip 50 helps hold the lining in place. The exterior of the diffuser 52 is likewise bolted to the prior art diffuser interface 36 by means of the fasteners 48 securing a diffuser flange 54 to a stainless steel plate 56, which along with fasteners 46 seals the gasket 44 to the second interface flange 40.

Turning to FIG. 4 an embodiment of the present invention is illustrated. The diffuser interface 58 bridges between the outlet of the gas turbine 59 and the diffuser 12. First interface flange 38 is welded to the gas turbine flange 32. A thermally flexible region 60 is attached to the flange and extends downstream in a generally cylindrical form or a slightly tapering form with the circumference growing larger as the distance downstream increases to form a transition passage. The thermally flexible region is made of stainless steel material and is designed to have a thermal expansion rate equivalent to that of the gas turbine flange. As a result, when the temperature of the systems changes, the thermally flexible region will expand or contract at the same rate as the outlet flange. Due to this equivalent expansion and contraction, the stresses across the joint between the flanges 38 and 32 are minimized. As a result, the seal welding can survive the stresses and still provide a gas tight seal. A separate gasket is no longer required for making that seal. A tapered transition portion 62 is welded to the thermally flexible region 60. This transition portion 62 tapers outwardly in a downstream direction to match the periphery of the diffuser 12 at the transition portion-diffuser interface 64. The transition portion-diffuser interface 64 can include a seal weld around the circumference.

So as to localize the thermal expansion in the thermally flexible region 60 of the interface 58, the tapered transition portion 62 is increasingly internally insulated in a downstream direction. Layers of insulation 66 are added as the distance from the outlet end 18 increases. This additional insulation can be in the form of additional layers of insulation of a uniform resistivity to thermal transfer, or in the form of material of increasing resistivity to thermal transfer. At the end of the tapered transition portion 62 where the insulation joins to the diffuser 12 at the tapered transition portion-diffuser interface 64, the internal insulation thickness and resistivity of the interface 58 should match the internal insulation of the diffuser 12. External insulation of the gas turbine and the diffuser interface may also be supplied as known in the prior art. Where the diffuser interface is internally insulated, the external insulation may be correspondingly decreased.

To prolong the life of the insulation and to protect it against deleterious effects of the exhaust gas, an internal liner 68 covers the insulation. The liner is held in place by bolts 70 and washers 72 which hold the liner against the insulation. The bolts 70 can themselves be affixed to the interior of the diffuser interface itself shell, such as at 74 or studs 76 can be affixed to the interior of the diffuser interface 58 by use of plates 78. The liner is allowed to float in response to thermal expansion and contraction by oversized holes through which the bolts 70 or studs 76 protrude.

Figure 6:
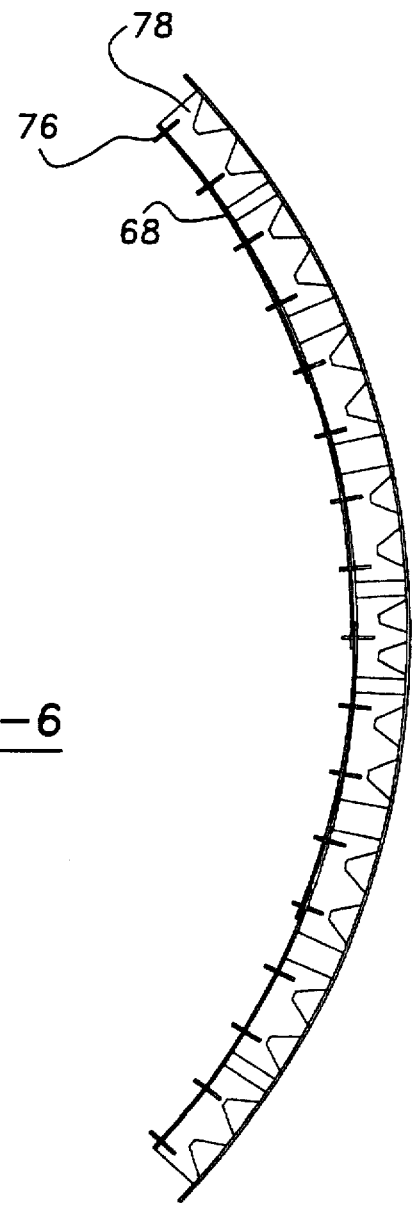
FIG. 6 is a cross section taken through the wall of the diffuser.
Figure 5:
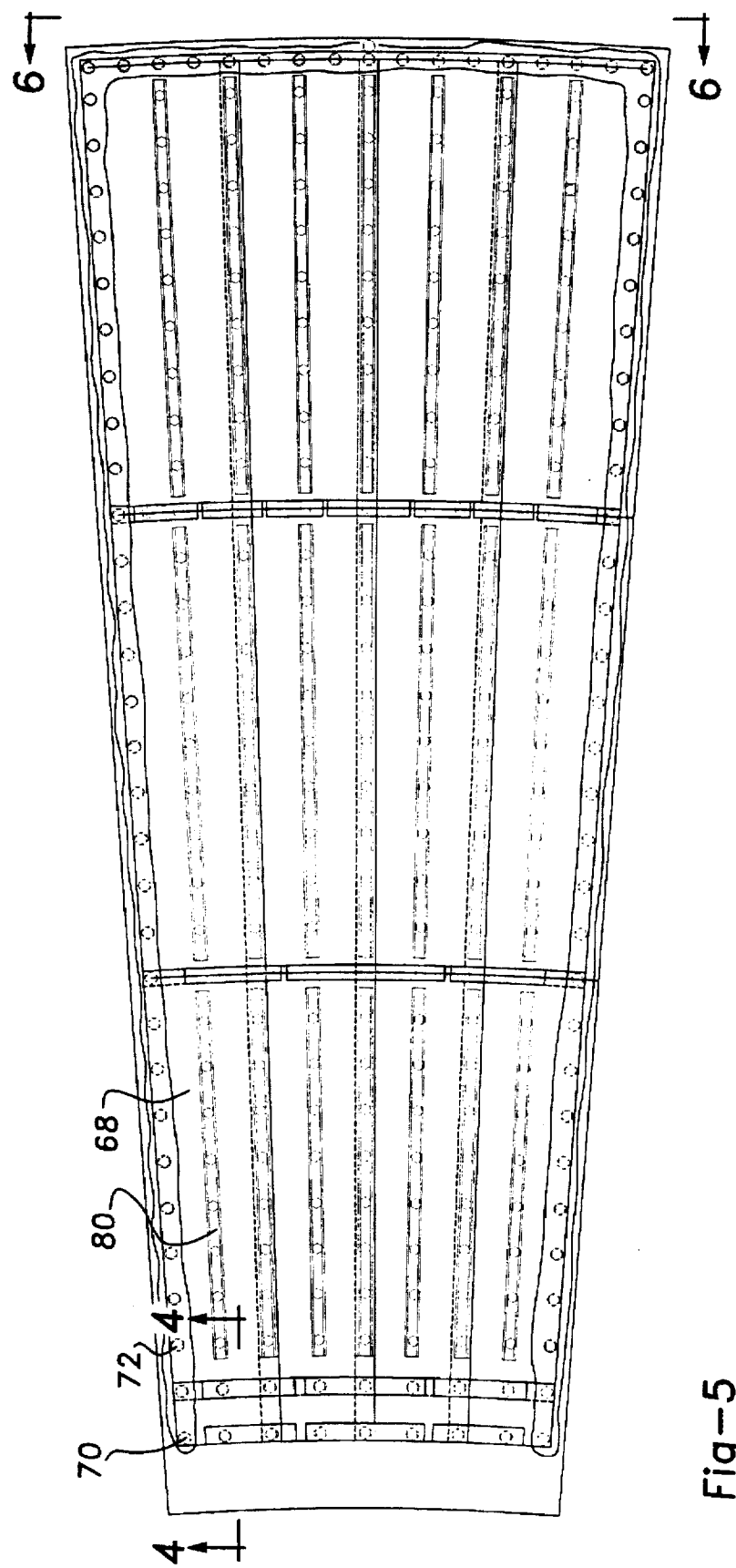
FIG. 5 is a flat layout showing the interior of a portion of the interface and diffuser.

FIG. 5 shows a portion of the liner assembly for the inside of diffuser 12. FIG. 5 is a flat layout of the liner assembly of approximately a 90° portion of the diffuser. FIG. 4 represents a section through section line 4—4 of FIG. 5. U-shaped channels 80 on top of liner 68 are also held down by nut and bolt combinations 70 or studs with nuts and washers 72. The liner 68 is provided in the form of plates or sheets which are lapped as shown in FIG. 6 to reduce the intrusion of gas against the insulation. By tying the floating liner to the thermally flexible region 60, the floating liner flexes to conform with the changing contour of the outer cone as shown in FIG. 4A. FIG. 4A shows the interface 58 in a typical position assumed during operation when hot exhaust gases have heated up the components. The seal at the turbine outlet end 18 has been maintained because the welded seal has expanded at the same rate due to the expansion of the interface. The floating liner 68 has also moved with the thermally flexible region 60 to keep hot exhaust gases away from the insulation 66. The tapered transition portion-diffuser interface 64 is also maintained with minimum stress due to the like insulation and therefore, like expansion rates, due to the matching insulation. Due to the increasing insulation, less heat is transferred to the outside of the interface at the exit end and/or transferred at a slower rate than at the inlet end. Therefore, the interface cone tends to flex in the middle, rather than at the exit connection to the gas diffuser. As a result, gas tight seals are maintained.

EXAMPLE

By way of example, a diffuser having an inlet diameter of approximate ten feet at the inlet to the interface and an exit gas path diameter at the end of the diffuser of fifteen and one-half feet is approximately thirty-one feet long. The turbine exhaust outlet flange is constructed of a type 321 stainless steel with an expansion joint. The first interface flange is a plate 1"×½" thick ASTM A 167 type 321 stainless steel. The thermally flexible region is approximately 10" long, with a tapered transition zone approximately 1', 8" long. The flexible liner is formed of 11 gauge type 409 stainless steel. The insulation consists of an innermost (nearest the liner) layer of 2" insulation weighing 8 lbs per cubic ft. The insulating material is expanded ceramic fiber such as Kaowool. Three additional layers each 1½" thick, weighing 8 lbs. per cubic. ft. of material are used at the tapered transition portion-diffuser interface. The entire diffuser interface is 2 ft. 6" in length. It is to be understood that the apparatus of the present will admit of other embodiments. The detailed description is given only to facilitate of the invention by those skilled in the art and should not be construed as limiting the invention.

What is claimed is:

1. An exhaust gas diffuser interface between an exhaust gas source and an exhaust gas diffuser comprising:

an interface connector to be attached to an exhaust gas outlet;

a thermally flexible member attached to said interface connector;

a thermal transition member downstream from said thermally flexible member and attached to an exhaust gas diffuser;

thermal insulation mounted on the gas side of said thermal transition member of continuously increasing thermal resistivity with increasing distance from said exhaust gas source.

2. The exhaust gas diffuser interface of claim 1 further comprising an internal liner over said thermal insulation to reduce contact of exhaust gases with said thermal insulation.

3. The exhaust gas diffuser interface of claim 2 wherein said internal liner is able to float in response to changes in thermal stresses.

4. The exhaust gas diffuser interface of claim 1 wherein said interface connector is seal welded to said exhaust gas outlet.

5. The exhaust gas diffuser interface of claim 1 wherein said interface connector is connected to said exhaust gas outlet without the aid of a compressible gasket.

6. The exhaust gas diffuser interface of claim 1 wherein said thermally flexible member is uninsulated between the exhaust gas surface and the ambient surface.

7. An exhaust gas interface between a gas turbine and an exhaust diffuser inlet comprising:

a sealing member welded in a gas tight sealing arrangement to the exhaust outlet of said gas turbine;

a thermally flexible member secured to said sealing member constructed to thermally flex an amount corresponding to the thermal expansion and contraction of said exhaust outlet; and a transition member extending between said thermally flexible member and said exhaust diffuser inlet and having increasing internal thermal insulation as said transition member extends in the downstream direction.

8. The exhaust gas interface of claim 7 wherein said transition member is designed to undergo relatively less thermal expansion and contraction compared to said thermally flexible member.

9. The exhaust gas diffuser interface of claim 7 wherein said transition member is internally thermally insulated relative to said thermally flexible member.

10. The exhaust gas diffuser interface of claim 7 wherein said internal thermal insulation is of a relatively constant thermal resistivity value but increasing in thickness with increasing distance downstream from said gas turbine.

11. The exhaust gas diffuser interface of claim 7 wherein said thermal insulation increases in resistance to thermal transfer with increasing distance from the exhaust gas source.

12. An exhaust gas diffuser interface of claim 7 wherein the sealing member is designed to be seal welded to the exhaust gas outlet and the transition member is designed to be seal welded to the exhaust gas diffuser.

13. The exhaust gas diffuser interface of claim 7 wherein a thermally floating liner protects the internal side of the insulation from direct impingement by exhaust gases.

14. An exhaust gas diffuser system comprising:

a gas turbine exhaust outlet;

an exhaust gas diffuser interface opening flange seal welded to said gas turbine exhaust outlet;

a thermally flexible exhaust gas passage connected to said interface opening flange and designed to expand and contract in unison with said exhaust outlet in response to changing thermal conditions;

internally insulated transition member connected to said thermally flexible exhaust gas passage;

internally insulated exhaust gas diffuser secured to said insulated transition members.

15. The system of claim 14 further comprising continuously varying insulation over the length of said transition member.

16. The system of claim 15 wherein said insulation varies in thickness with distance from the exhaust outlet.

17. The system of claim 15 wherein said insulation varies in thermal conductivity with increasing distance from the exhaust gas outlet.

\* \* \* \* \*

UNITED STATES PATENT AND TRADEMARK OFFICE
CERTIFICATE OF CORRECTION

PATENT NO. : 5,669,812
DATED : September 23, 1997
INVENTOR(S) : Gene F. Schockemoehl; L. Matt Farabee; David W. Daniels It is certified that error appears in the above-indentified patent and that said Letters Patent is hereby corrected as shown below:

Column 2, line 33, after "view" insert -- of --.

Column 4, line 31, "approximate" should be -- approximately --.

Column 4, line 43, after "cubic" delete -- . --.

Column 4, line 46, after "present" insert -- invention --.

Column 4, line 60, after "diffuser;" insert -- and --.

Signed and Sealed this

Twenty-seventh Day of January, 1998

Attest:

BRUCE LEHMAN

Attesting Officer

Commissioner of Patents and Trademarks